Patented June 15, 1948

2,443,304

UNITED STATES PATENT OFFICE 2,443,304

HALOGENOPYRIMIDINE DERIVATIVES

Francis Henry Swinden Curd, Manchester, England, Margaret Isabel Hall (née Davis), Annan, Scotland, and Edmund Cecil Owen, Francis Leslie Rose, and George Alfred Peter Tuey, Manchester, England, assignors to Imperial Chemical Industries Limited, a corporation of Great Britain No Drawing. Application August 28, 1945, Serial No. 613,217. In Great Britain September 25, 1944

8 Claims. (Cl. 260—251)

This invention relates to the manufacture of new pyrimidine compounds which are useful as intermediates in the manufacture of chemotherapeutic agents and especially of the parasiticidal agents of our copending application Serial No. 613,218 of even date herewith.

The said new compounds are pyrimidine derivatives of the formula

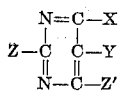

wherein X is hydrogen or a hydrocarbon radical, Y is hydrogen or a neutral substituent such, for example, as a hydrocarbon radical, an alkoxy or aryloxy or alkylmercapto group, or a cyano group, and also X and Y may be joined together to form an alkylene chain, and of the groups Z and Z', one is a halogen atom and the other is a substituted amino group of the form

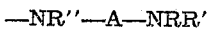

wherein R″ is a hydrogen or an alkyl or simply substituted alkyl group, for example, an alkoxyalkyl or dialkylaminoalkyl group, A is a linking group which is aliphatic or alicyclic or aliphatic-carbocyclic and may be substituted, for example, by hydrocarbon radicals, alkoxy groups or dialkylaminoalkyl groups and, where A or part of A is an aliphatic chain, it may be interrupted by oxygen, nitrogen or sulphur atoms, and NRR′ is a substituted amino group such as acylamino, alkylamino or dialkylamino or piperidino or other strongly basic nitrogen-containing heterocyclic group.

We make the said new compounds by a process comprising the interaction of the corresponding 2- or 4-hydroxy-pyrimidine derivative with a halogenating agent, namely the pentachloride, pentabromide, oxychloride or oxybromide of phosphorus, or a mixture of such agents, such as a mixture of phosphorus pentachloride and phosphorus oxychloride.

The reaction is conveniently brought about by heating the reagents together, optionally in the presence of a solvent or diluent. When phosphorus oxychloride is used as the halogenating agent, an excess thereof forms a very convenient reaction medium. Alternatively an inert organic solvent, preferably boiling at or above 130° C., for example, monochlorobenzene, may be used.

The 2- or 4-hydroxypyrimidine derivatives used as starting materials are conveniently made by the interaction of an appropriate diamine with a 2- or 4-alkylmercaptopyrimidine which bears an OH group in position 4 or 2 respectively, and which is suitably substituted if necessary in the 5- and 6-positions, as is described in our copending application Serial No. 613,216 of even date herewith.

As examples of suitable hydroxypyrimidine starting materials there may be mentioned, 2-γ-dibutylaminopropylamino- 4 -hydroxypyrimidine, 2-β-diethylaminoethylamino-4-hydroxy-6-methylpyrimidine, 2-γ-diethylaminopropylamino - 4 - hydroxy-6-methylpyrimidine, 2-δ-diethylaminobutylamino-4-hydroxy-6-methylpyrimidine, 2-γ-dimethylaminopropylamino-4-hydroxy-6 - methylpyrimidine, 2-γ - dibutylaminopropylamino-4- hydroxy-6-methylpyrimidine, 2-δ-diethylamino-α-methyl - butylamino-4-hydroxy - 6 - methylpyrimidine, 2-γ-piperidinopropylamino-4-hydroxy-6-methylpyrimidine, 2-γ-diethylaminopropylamino-4-hydroxy-5-ethyl-6-methylpyrimidine, 2-hydroxy-4-β - diethylaminoethylamino - 6 - methylpyrimidine, 2-γ-dibutylaminopropylamino-4-hydroxy-5:6-dimethylpyrimidine, 2-γ-butylaminopropylamino-4-hydroxy-6 - methylpyrimidine, 2-(N-methyl-N-β-diethylaminoethylamino)- 4-hydroxy-6-methylpyrimidine, 2 -γ- (β'- diethylaminoethoxy) -propylamino-4-hydroxy-6- methylpyrimidine, 2-γ-(N-methyl-N-β'-diethylaminoethyl-amino) -propylamino-4-hydroxy-6 - methylpyrimidine, 2-hydroxy - 4 - γ - diethylaminopropylamino-6-methylpyrimidine, 2-γ - dibutylaminopropylamino-4-hydroxy-5-ethyl-6- methylpyrimidine, 2-hydroxy-4-δ-diethylamino-α-methylbutyl-amino-6-methylpyrimidine, 2-β-acetylaminoethylamino-4-hydroxy-6-methylpyrimidine, and 2-β-diethylaminoethylamino-4-hydroxy- 5:6 - dimethylpyrimidine.

The following examples illustrate, but do not limit, the invention. The parts are by weight.

Example 1

44.8 parts of 2-β-diethylaminoethylamino-4-hydroxy-6-methylpyrimidine and 100 parts of phosphorus oxychloride are mixed and heated gradually to boiling. A vigorous reaction occurs at or near the boiling point and the hydroxy compound passes into solution. The reaction is completed by boiling for 5 minutes. The reaction mixture is then cooled rapidly and poured on to ice. A clear deep yellow solution is formed. This is made alkaline with caustic soda. An orange coloured oil is precipitated and is extracted with benzene. The benzene extract is in turn extracted with 2.5% acetic acid and the acetic acid extract is made alkaline with caustic soda. The liberated oil is extracted with benzene, the benzene solution is dried over solid caustic potash and the benzene is distilled off. The residual oil is distilled in vacuo and the fraction B. P. 140° C./0.1 mm. is collected. This consists of 4-chloro-2-β-diethylaminoethylamino-6-methylpyrimidine which crystallises on standing as colourless needles, M. P. 33° C. It forms a dipicrate which, crystallised from β-ethoxyethanol, has M. P. 158°–159° C.

By working in a similar manner but using other appropriate hydroxypyrimidine derivatives as starting materials the following further compounds are obtained.

Example 2

4 - chloro - 2 - γ - diethylaminopropylamino-6-methylpyrimidine B. P. 186°/12 mm. The dipicrate has M. P. 157° C.

Example 3

4 - chloro - 2 - δ - diethylaminobutylamino - 6 - methylpyrimidine, dipicrate M. P. 146° C.

Example 4

4 - chloro - 2-γ-dimethylaminopropylamino-6-methylpyrimidine, B. P. 140° C./0.6 mm., dipicrate M. P. 146°–147° C.

Example 5

4 - chloro - 2 - γ - dibutylaminopropylamino-6-methylpyrimidine, dipicrate M. P. 156°–157° C.

Example 6

4 - chloro - 2 - δ - diethylamino-α-methylbutyl-amino-6-methylpyrimidine, B. P. 142° C./0.07 mm., dipicrate M. P. 148°–149° C.

Example 7

4 - chloro - 2 - γ-(β'-diethylaminoethoxy)-propylamino-6-methylpyrimidine, B. P. 150°–152° C./0.15 mm., dipicrate M. P. 111°–113° C.

Example 8

4 - chloro - 2 - γ - dibutylaminopropylaminopyrimidine, dipicrate M. P. 150–151° C.

Example 9

4 - chloro - 2 - γ - butylaminopropylamino - 6 - methylpyrimidine. This substance is an oil which cannot be distilled without decomposition; it decomposes also on standing at room temperature yielding a substance of high melting point.

Example 10

6.5 parts of 2-γ-dibutylaminopropylamino-4-hydroxy-5:6-dimethylpyrimidine and 15 parts of phosphorus oxychloride are mixed and the mixture is gradually heated to 100° C. whereupon a vigorous reaction occurs. The mixture is then refluxed for 10 minutes to complete the reaction, rapidly cooled and poured on to ice. The clear solution so obtained is made alkaline with sodium hydroxide, the temperature being kept below 20° C., and the oil which is precipitated is extracted with ethyl acetate. The extract is dried over anhydrous sodium sulphate, the solvent is distilled off and the residue is distilled under diminished pressure. 4 - chloro - 2 - γ - dibutylaminopropyl-amino-5:6-dimethylpyrimidine is thus obtained as a colourless viscous oil, B. P. 180°–185° C./4.5 × $10^{-3}$ mm. The dipicrate has M. P. 167.5°–168.5° C.

Example 11

37.5 parts of 2-γ-piperidinopropylamino-4-hydroxy-6-methylpyrimidine and 100 parts of phosphorus oxychloride are mixed and heated to boiling. A vigorous reaction occurs at or near the boiling point and the hydroxy compound passes into solution. The reaction is completed by boiling for ½ hour and the reaction mixture is then cooled and poured on to ice. A clear, deep yellow solution is formed. This is made alkaline with caustic soda. An orange coloured oil is precipitated and is extracted with benzene. The benzene extract is in turn extracted with 10% acetic acid and the acetic acid extract is made alkaline with caustic soda. The liberated oil is extracted with benzene, the benzene solution is dried over solid caustic soda and the benzene is distilled off. The residual oil is distilled in vacuo and the fraction B. P. 127°/0.4 mm. is collected. This consists of 4-chloro-2-γ-piperidinopropyl-amino-6-methylpyrimidine which crystallises on standing as dull yellow needles M. P. 52°–53° C. It forms a dipicrate which, crystallised from β-ethoxyethanol, has M. P. 195° C.

By working in a similar manner but using other appropriate hydroxypyrimidine derivatives as starting materials the following further compounds are obtained.

Example 12

4 - chloro - 2-γ-(N-methyl-N-β'-diethylamino-ethylamino) - propylamino-6-methylpyrimidine, B. P. 142°–144° C./0.12 mm., tripicrate M. P. 180°–181° C.

Example 13

4 - chloro - 2 - (N - methyl-N-β-diethylamino-ethyl-amino)-6-methylpyrimidine, B. P. 133°–135° C./0.8 mm., monopicrate M. P. 144°–145° C.

Example 14

50.7 parts of 2-γ-diethylaminopropylamino-4-hydroxy-5-ethyl - 6 - methylpyrimidine and 170 parts of phosphorus oxychloride are mixed together and heated to boiling. A vigorous reaction occurs at or near the boiling point and the hydroxy compound passes into solution. The reaction is completed by boiling for 2 minutes and the reaction mixture is then cooled and poured on to ice. A clear, deep yellow solution is formed. This is made alkaline with caustic soda. An orange coloured oil is precipitated and is extracted with benzene. The benzene extract is in turn extracted with 10% acetic acid and the acetic acid extract is made alkaline with caustic soda. The liberated oil is extracted with benzene, the benzene solution is dried over solid caustic soda and the benzene distilled off. The residual oil is distilled in vacuo and the fraction B. P. 138° C./0.1 mm. is collected. This consists of 4 - chloro - 2-γ - diethylaminopropyl-amino-5-ethyl-6-methylpyrimidine. It forms a dipicrate which, crystallised from β-ethoxyethanol has M. P. 160°–161° C.

Example 15

By working as described in Example 14, but using 2-γ-dibutylaminopropylamino-4-hydroxy-5-ethyl-6-methylpyrimidine as the starting material there is obtained 4-chloro-2-γ-dibutyl-aminopropylamino-5-ethyl -6- methylpyrimidine; it is an oil which forms a dipicrate of M. P. 140°–141° C.

Example 16

20 parts of 2-β-acetylaminoethylamino-4-hydroxy-6-methylpyrimidine and 60 parts of phosphorus oxychloride are refluxed together until a homogeneous solution is formed. This requires about half an hour. The excess of phosphorus oxychloride is then distilled off under diminished pressure and the residue is poured into a mixture of ice and sodium hydroxide solution. The oil which is precipitated is extracted with benzene, the extract is dried and the benzene is distilled off. The residue, which is 4-chloro-2-β-acetylaminoethylamino-6-methylpyrimidine, is crystallised from a mixture of benzene and petroleum ether; it then has M. P. 113°–114° C.

*Example 17*

20 parts of 2-hydroxy-4-β-diethylaminoethylamino-6-methylpyrimidine and 50 parts of phosphorus oxychloride are refluxed together for 2 hours. The reaction mixture is cooled, poured into ice and water and made alkaline with ammonia. The liberated oil is extracted with benzene, the solution is dried over anhydrous potassium carbonate and the benzene is distilled off. 2-chloro-4-β-diethylaminoethylamino-6-methylpyrimidine remains. It is distilled in vacuo and the portion with B. P. 152°–154° C./0.05 mm. is collected. It forms a dipicrate which, crystallised from ethanol, has M. P. 126–128° C.

*Example 18*

56.5 parts of 4-δ-diethylamino-α-methylbutylamino-2-hydroxy-6-methylpyrimidine and 300 parts of phosphorus oxychloride are refluxed together for 14 hours. The excess of phosphorus oxychloride is then distilled off under diminished pressure. The residue is poured on to ice and the solution so obtained is made alkaline with caustic soda, the temperature being kept below 30° C. by addition of ice as needed. The oil which separates out is extracted with benzene, the extract is dried and the benzene is distilled off. The oil remaining is distilled under diminished pressure whereby 2-chloro-4-δ-diethylamino-α-methylbutyl-amino-6-methylpyrimidine of B. P. 185°–188° C./1.2 mm. is obtained.

*Example 19*

7.0 parts of 2-β-diethylaminoethylamino-4-hydroxy-5:6-dimethylpyrimidine and 20 parts of phosphorus oxychloride are heated together under reflux. When the temperature reaches 100° C. a vigorous reaction occurs. The mixture is then boiled for a further 2½ minutes, cooled rapidly and poured on to ice. The clear yellow solution so obtained is made alkaline with sodium hydroxide and the oil which separates out is extracted with ether. The ether solution is dried, the ether is evaporated off and the residue is distilled under a pressure of $2.4 \times 10^{-4}$ mms. from a bath at 140°–150° C. The distillate solidifies and can be purified by sublimation at 90° C./$10^{-2}$ mms. It is 2-β-diethylaminoethylamino-4-chloro-5:6-dimethylpyrimidine and has M. P. 46.5–47.5° C.

*Example 20*

62.5 parts of 2-hydroxy-4-γ-diethylaminopropylamino-6-methylpyrimidine dihydrochloride and 500 parts of phosphorus oxychloride are refluxed together for 8 hours. The excess of phosphorus oxychloride is then distilled off under diminished pressure and the residue is poured on to ice. The solution so obtained is made alkaline by gradual addition of caustic soda, care being taken to avoid undue rise of temperature, and the base which is liberated is extracted with benzene. The benzene solution is dried and the benzene is distilled off. The residue is distilled under diminished pressure. 2-chloro-4-γ-diethylaminopropylamino-6-methylpyrimidine distils over at 164°–166° C./0.9 mm. and solidifies on cooling. After crystallisation from petroleum ether it has M. P. 45° C.

Whereas the above description and Examples illustrate many widely varied embodiments of the invention it will be apparent to one skilled in the art that many other embodiments and variations may be devised without departing from the spirit and scope thereof and accordingly it is to be understood that the invention is not in any way limited except as defined in the following claims.

We claim:

1. A compound of the pyrimidine series characterized by carrying a halogen atom in one of the positions 2 and 4 and a diamine radical in the other of said two positions, said diamine radical having the form —NH—A—NRR′, wherein NRR′ is a strongly basic radical selected from the group consisting of primary, secondary and tertiary amine radicals and heterocyclic nitrogenous base radicals, while A is an organic radical linking the two N-atoms of the diamine and interposing therebetween at least two aliphatic carbon atoms.

2. A compound of the general formula

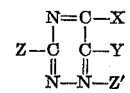

wherein X designates a member of the group consisting of hydrogen and hydrocarbon radicals, Y is a member of the group consisting of hydrogen and hydrocarbon radicals; one of the symbols Z and Z′ stands for a halogen atom, while the other one designates a diamine radical, said diamine radical having the form —NH—A—NRR′, wherein NRR′ is a strongly basic radical selected from the group consisting of primary, secondary and tertiary amine radicals and heterocyclic nitrogenous base radicals, while A is an organic radical linking the two N-atoms of the diamine and interposing therebetween at least two aliphatic carbon atoms.

3. A compound of the general formula

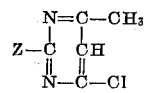

wherein Z designates a diamine radical having the form —NH—A—NRR′, wherein NRR′ is a strongly basic radical selected from the group consisting of primary, secondary and tertiary amine radicals and heterocyclic nitrogenous base radicals, while A is an organic radical linking the two N-atoms of the diamine and interposing therebetween at least two aliphatic carbon atoms.

4. A compound of the general formula

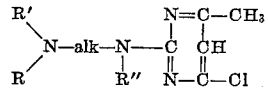

wherein alk designates an alkylene radical which interposes at least 2 and not more than 6 carbon atoms between the two N-atoms, R″ stands for a member of the group consisting of hydrogen and alkyl, while

is a strongly basic radical selected from the group consisting of primary, secondary and tertiary amine radicals and heterocyclic nitrogenous base radicals.

5. A compound of the general formula

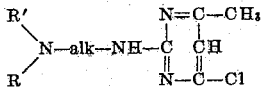

wherein alk designates an alkylene radical which interposes at least 2 and not more than 6 carbon atoms between the two N-atoms, R is a member selected from the group consisting of hydrogen and alkyl, while R' designates an alkyl radical.

6. 4-chloro-2-γ-dibutylaminopropylamino - 6 - methylpyrimidine.

7. 2-chloro-4-γ-diethylaminopropylamino - 6 - methylpyrimidine.

8. 4-chloro-2-γ-dibutylaminopropylamino-5:6-dimethylpyrimidine.

FRANCIS HENRY SWINDEN CURD.
MARGARET ISABEL HALL (NÉE DAVIS).
EDMUND CECIL OWEN.
FRANCIS LESLIE ROSE.
GEORGE ALFRED PETER TUEY.

REFERENCES CITED

The following references are of record in the file of this patent:

Journ. Amer. Chem. Soc., vol. 67 (1945), pp. 1159–61.

Journ. Amer. Chem. Soc., vol. 67 (1945), pp. 735–38.

Amer. Chemical Journal, vol. 33 (1905), pp. 439 and 449.